United States Patent [19]

Barkhimer

[11] Patent Number: 4,997,004
[45] Date of Patent: Mar. 5, 1991

[54] HIGH CYCLE SOLENOID VALVE

[75] Inventor: Robert L. Barkhimer, Chula Vista, Calif.

[73] Assignee: BKM, Inc., San Diego, Calif.

[21] Appl. No.: 823,807

[22] Filed: Jan. 29, 1986

[51] Int. Cl.⁵ .................. F15B 13/044; F16K 31/06; F16K 1/14

[52] U.S. Cl. ................ 137/596.17; 137/901; 251/129.14

[58] Field of Search .............. 137/596.17, 625.65, 137/901; 239/585; 251/129.14, 129.19, 333, 334

[56] References Cited

U.S. PATENT DOCUMENTS

| | | | |
|---|---|---|---|
| 3,245,652 | 4/1966 | Roth | 251/129.14 |
| 3,464,668 | 9/1969 | Jacob | 251/129.14 |
| 3,829,060 | 8/1974 | von Lewis | 251/129.02 |
| 4,391,292 | 7/1983 | Millar | 137/596.17 X |
| 4,585,174 | 4/1986 | Knapp | 239/585 X |
| 4,610,267 | 9/1986 | Beck et al. | 137/596.17 X |
| 4,628,881 | 12/1986 | Beck et al. | 239/91 X |

FOREIGN PATENT DOCUMENTS

| | | | |
|---|---|---|---|
| 94610 | 11/1983 | European Pat. Off. | 251/129.14 |
| 2412133 | 9/1984 | Fed. Rep. of Germany | 137/596.17 |
| 1183760 | 3/1970 | United Kingdom | 137/901 |

*Primary Examiner*—Gerald A. Michalsky
*Attorney, Agent, or Firm*—Albert L. Gabriel

[57] ABSTRACT

The present invention is a solenoid-actuated fluid valve of the ball poppet type particularly suitable for use as a fuel injector actuator/timer, for which use the valve must be capable of withstanding high operating speeds and high fluid pressures for a very high cycle life, without substantial internal tolerance variation. According to the invention, the free front end of the solenoid-operated valve actuator pin has a concavity therein which distributes impact loads between the pin and the ball poppet which it engages over an extended line or area contact so as to minimize deformation of the pin and thereby minimize solenoid tolerance variation in the axial direction. Fluid captured between the ball and concavity provides squish-damping as the pin approaches the ball so as to further reduce impact deformation of the pin end. Engagement of the ball in the pin end concavity also tends to hold the ball in axial alignment with its valve seat so as to minimize eccentric wear of the valve seat.

14 Claims, 3 Drawing Sheets

HIGH CYCLE SOLENOID VALVE

BACKGROUND OF THE INVENTION

1. Field of the Invention

The present invention relates to high speed, high cycle solenoid ball poppet valves, and it relates particularly to such valves having sufficiently close-tolerance durability for use as fuel injector actuators.

2. Description of the Prior Art

Some fuel injectors for internal combustion engines, either diesel or gasoline fueled, are actuated and timed by means of a solenoid ball poppet valve for each injector. For each injection cycle such valve shifts between a solenoid-actuated supply position in which the valve supplies high pressure fluid to an injector piston, and a solenoid-unactuated vent position in which the high pressure supply fluid is blocked and fluid is vented from the injector piston. Typically, such injector actuator solenoid valve will have a pair of ball poppets, one for supply and one for vent, one ball being directly engaged and actuated by the end of a solenoid plunger pin, and the other ball being actuated by a separator pin slideably mounted between the two balls with its opposite ends engageable against the respective balls.

Conventional practice in solenoid-actuated ball poppet valves has been to provide squared-off ends on the solenoid plunger pin and the separator pin. While this is satisfactory for most ball poppet valve usages, it is not satisfactory for the fuel injector use because it involves point contacting between the flat pin ends and the ball poppets, and in the fuel injector use, these point contacts involve high contact stresses which are repeated at high frequency and are applied over a very high cycle life. In the fuel injector use, fluid pressures on the ball poppets range from approximately 600 to approximately 1,500 psig, causing high point contact forces and consequent stresses. The fuel injector cycling rate is up to 120 Hertz or cycles per second, so the point contact stresses between pin ends and balls are repeated at a rate of up to 120 Hertz. For the fuel injector use, the valve must be able to withstand as many as 500 million to a billion cycles, and long before such high cycle life is achieved, such point contact stresses would result in substantial pin end deformation that would interfere with accurate repeatability of valve function during the life of the valve and would ultimately render the valve inoperative for its intended purpose because of close solenoid tolerance to obtain the necessary actuating force.

In addition to this problem of pin end distortion and consequent lack of accurate repeatability and loss of the required close tolerance over a high cycle life, the conventional flat pin ends tend to cause unpredictable eccentric engagement of the ball poppets against their respective valve seats, and this in turn causes two problems. First, the resulting irregularities in ball seating result in a lack of accurate repeatability of valve functioning, and in the fuel injector actuator usage, accurate valve function repeatability is very important. Second, such irregular, eccentric ball seating causes valve seat wear during the high cycle life to which such valves are subjected in the fuel injector usage, which will ultimately result in improper valve operation.

SUMMARY OF THE INVENTION

In view of these and other problems in the art, it is a general object of the present invention to provide a solenoid valve of the ball poppet type which is capable of withstanding the high speed, high pressure and high cycle life requirements for a valve employed as a fuel injector timer and actuator.

Another object of the invention is to provide a solenoid-actuated valve of the ball poppet type wherein ball actuator pin wear is minimized by a novel concave pin end configuration which spreads ball engagement loads over an extended line or area contact, providing the valve with an extremely large cycle life of high speed, high pressure operation without substantial internal tolerance variation.

Another object of the invention is to provide, in a solenoid-actuated ball poppet-type valve, a novel ball actuator pin configuration which tends to axially center poppet balls as they are moved toward their valve seats, fOr improved repeatability of valve function and minimization of valve seat wear over an extended cycle life of high speed, high pressure operation.

In a solenoid valve according to the present invention, the primary valve actuation is effected by a solenoid plunger pin engaging a ball poppet valve element. The operative end of the plunger pin is provided with a concave engaging surface which distributes the contacting load over an extended line or area contact so as to avoid the aforesaid problems caused by point contact engagement of prior art squared-off pin ends with ball poppet elements. In one form of the invention, the solenoid plunger pin end concavity is a conical surface so as to provide an extended circular line contact. In a second form of the invention, the pin end concavity is spherical, preferably having substantially the same radius of curvature as the ball poppet which the pin engages so as to distribute the contacting load over this spherically concave pin end surface. In a third form of the invention, the pin end concavity has a compound surface configuration, with a bottom portion having a spherical surface with a radius of curvature substantially the same as that of the ball poppet, and a lead-in forward, outer edge surface portion which has a bell-like flare All three of these forms of the invention distribute the impacting load between the pin and ball over an extended line or area contact so as to minimize deformation of the pin in the axial direction. All three forms of the invention also provide automatic centering of the ball coaxially with the pin with consequent coaxial centering of the ball relative to the valve seat. The resulting minimization of axial pin deformation maintains the integrity of a very small solenoid magnetic gap a full solenoid plunger thrust, on the order of 0.002 to 0.003 inch, and the ball centering action minimizes valve seat wear. These two wear-minimizing results enable a solenoid-actuated ball poppet valve according to the invention to withstand the severe forces and stresses which occur in use of the solenoid-actuated ball poppet valve for fuel injector actuation and timing where they are high because of high pressure requirements, on the order of 600 to 1,500 psig, where valve speeds are high, up to 120 cycles per second, and where the cycle life is extremely high, on the order of 500 million to a billion cycles.

The pin end concavity improvement of the invention is most important for the solenoid plunger pin which, because of required tolerances and valve element movement distances, accelerates to substantial speeds with consequent high impact loads upon ball engagement and seating. The pin end concavity also has substantial utility for the ends of a separator pin employed in three-way forms of the invention in which one ball poppet is engaged by the solenoid plunger pin in a primary actuation engagement, and a second ball poppet is sequentially engaged by movement of the first ball against the separator pin which, in turn, engages the second ball poppet.

BRIEF DESCRIPTION OF THE DRAWINGS

These and other objects of the invention will become more apparent in view of the following description taken in conjunction with the drawings, wherein.

DETAILED DESCRIPTION

The present invention is a solenoid-actuated ball poppet valve wherein pin or rod actuators that engage the balls for seating and unseating them have novel engagement surface configurations which greatly extend the operational life of valves embodying the invention. Although valves embodying the invention may serve a variety of uses, the invention was conceived particularly to satisfy the need for a high speed, high pressure, extremely durable ball poppet valve capable of serving as a fuel injector timer and actuator for the type of fuel injector disclosed and claimed in U.S. patent application of Niels J. Beck, Michael A. Calkins, William E. Weseloh, and Robert L. Barkhimer, Ser. No. 700,692, filed Feb. 12, 1985, now U.S. Pat. No. 4,628,881, for "Pressure-Controlled Fuel Injection for Internal Combustion Engines." The requirements for such a fuel injector actuator valve are severe. The valve must be able to withstand, without substantial internal tolerance variation, an extremely large number of cycles, on the order 500 million to a billion cycles. The valve must operate at high speed, current fuel injectors requiring up to 120 Hertz, and such operation is required to be at high pressure, ranging from approximately 600 psig to approximately 1,500 psig. Also, for the fuel injector actuator purpose, the valve cycling must be accurately repeatable both on a short-term basis and over the entire high cycle operational life of the valve. The high speed, high pressure operation of the valve for this fuel injector purpose causes severe impact forces and pressures where the ball poppets are engaged by the ball actuator pins of the valve, and it is critical to control the resulting stresses in order to obtain the high cycle life of 500 million to a billion cycles required of the valve. The present invention controls such stresses so as to enable such high cycle life to be achieved, while at the same time and with the same operative means assures accurate ball poppet alignment with valve seats which minimizes seat wear and assures accurately repeatable valve function.

The present invention is an improvement upon valves disclosed in U.S. Pat. No. 4,391,292, issued July 5, 1983, and U.S. patent application Ser. No. 411,298, filed Aug. 25, 1982, now U.S. Pat. No. 4,610,267, which, together with the aforesaid fuel injection patent application Ser. No. 700,692, now U.S. Pat. No. 4,628,881, are commonly owned.

Figure 1:
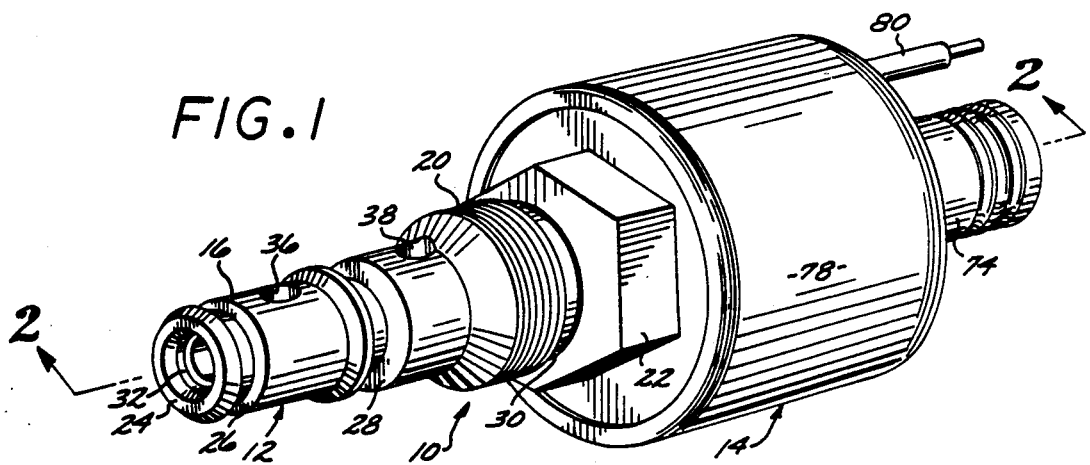
FIG. 1 is a perspective view, with the valve housing removed, of a three-way solenoid valve embodying the present invention, and particularly adapted for use as a fuel injector actuator and timer.
Figure 2:
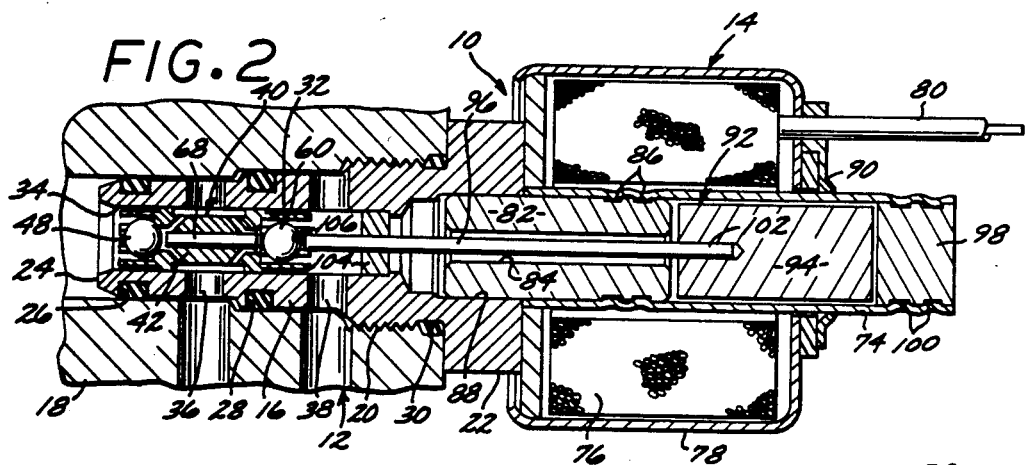
FIG. 2 is an axial section taken on the line 2—2 in FIG. 1, with portions in elevation, and with the housing shown in fragmentary axial section.
Figure 3:
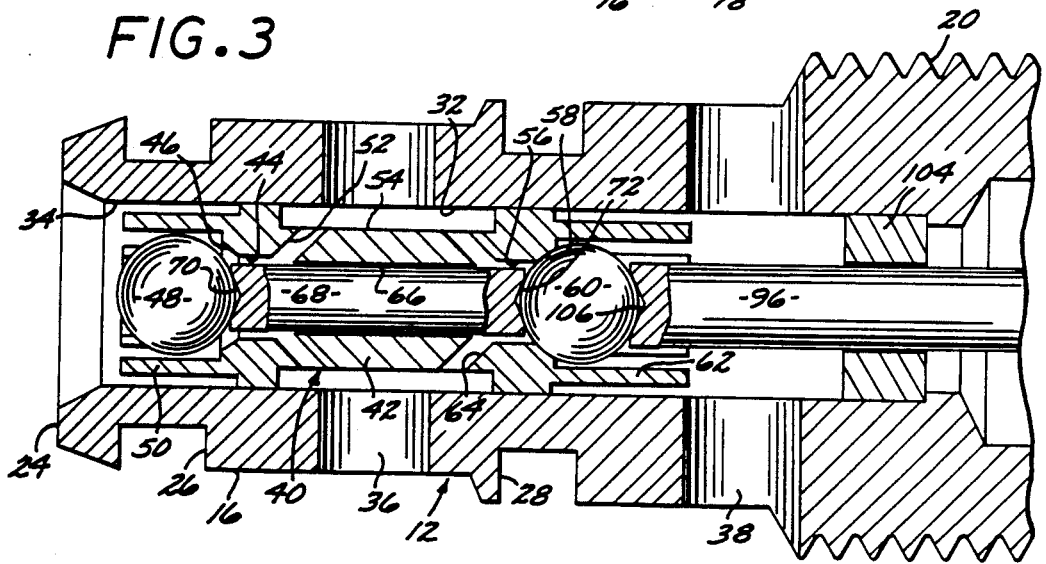
FIG. 3 is an enlarged, fragmentary axial section of the valve portion of the solenoid-actuated valve of the invention, with portions in elevation and portions broken away.

Referring to the drawings, and at first to FIGS. 1-3 thereof, the present invention is herein disclosed in connection with a three-way solenoid valve having two axially aligned ball poppets, one of which is directly engaged for actuation by the solenoid plunger, and the other of which is actuated by a separator pin intermediate the two balls The disclosed valve is considered to be a normally closed valve, in that the separator pin-actuated ball is normally closed to a high pressure fluid source. Such a three-way, normally closed solenoid valve configuration is particularly useful for the fuel injector actuator purpose.

The overall solenoid valve is generally designated 10, and includes fluid valve portion 12 and solenoid actuator portion 14 which are coaxially aligned. Referring at first to the valve portion 12, it is based upon an axially elongated, tubular, generally annular valve body 16. Body 16 fits within a valve housing 18, being threadedly connected therein by a threaded coupling 20. The threaded engagement is enabled by an enlarged hex nut end 22 of valve body 16. The other end of body 16 is fluid supply end 24 to which high pressure fluid is supplied. Three external annular seal ring grooves 26, 28 and 30 are spaced along the length of valve body 16 from the fluid supply end 24 to the hex nut 22 for effecting three annular fluid-tight seals between valve body 16 and valve housing 18. For the fuel injector use of the present valve, as for actuation of a fuel injector like that disclosed in the aforesaid U.S. patent application Ser. No. 700,692, now U.S. Pat. No. 4,628,881, the valve housing 18 may be the actual head portion of the fuel injector.

The valve body 16 has an axial bore 32 extending through its length, the bore 32 having a fluid supply end 34 opening at the supply end 24 of body 16. A pair of diametrically arranged supply passages 36 extend through the wall of body 16 between seal ring grooves 26 and 28, and a pair of diametrically arranged vent passages 38 extend through the wall of body 16 between seal ring groove 28 and threaded coupling 20, and hence between seal ring grooves 28 and 30.

An annular valve seat cartridge 40 is axially fixedly secured within bore 32 of valve body 16. Cartridge 40 extends generally from the supply end 34 of bore 32 to the vent passages 38, and has an annular body 42 axially centered in registry with the supply passages 36. An annular axial supply port 44 in cartridge body 42 opens at annular supply seat 46 which faces toward the supply end 34 of bore 32. Supply ball poppet valve element 48 is normally closed in seated engagement against valve seat 46. Supply ball 48 is guided in general axial alignment with the seat 46 by a series of regularly spaced, axially oriented guide fingers 50 which project from cartridge body 42 toward supply end 34 of bore 32. These guide fingers 50 may have inward staking (not shown) proximate their free ends for cage retention of supply ball 48. A plurality of regularly spaced supply holes 52, preferably four in number, extend from supply port 44 to an elongated external annular recess 54 in cartridge body 42, enabling pressurized fluid to pass through seat 46, supply port 44, and supply holes 52 into annular recess 54, and thence into diametral supply passages 36 when the supply ball 48 is moved off of its valve seat 46.

An annular vent port 56 in the opposite end of cartridge body 42 is coaxial with cartridge body 42 and supply port 44, facing in the opposite direction from supply port 44, or toward the solenoid actuator 14. Vent port 56 opens at coaxial, annular vent valve seat 58 against which vent ball poppet valve element 60 is adapted to seat. Vent ball 60 is normally spaced off of its seat 58 toward solenoid actuator 14, and is adapted to be driven into its seated position on seat 58 upon energization and actuation of solenoid 14. A regularly spaced series of axially oriented guide fingers 62 extends from cartridge body 42 toward solenoid 14 for guiding ball 60 in an axial path. Ball retention staking is not required on fingers 62 because vent ball 60 is retained in its operative position by the solenoid plunger. A plurality of regularly spaced vent holes 64, preferably four in number, extends through cartridge body 42 providing communication from diametral supply passages 36 and annular recess 54 to vent port 56, and with vent ball 60 spaced from its seat 58, such fluid communication extends through bore 32 past ball 60 to the diametral vent passages 38.

An axial passage 66 extends through the center of cartridge body 42 from supply port 44 to vent port 56, and a ball separator pin 68 is slideably mounted in passage 66 with its ends extending into supply port 44 and vent port 56. The length of separator pin 68 is such that when one of the balls 48 and 60 is seated on its respective valve seat 46 or 58, the other ball is held off of its seat. Thus, in the normally closed, seated position of supply ball 48, vent ball 60 is in the unseated, open position, which is the positions of the balls with solenoid 14 unactuated. This position is illustrated in FIG. 2. When the solenoid 14 is actuated, its plunger moves vent ball 60 to its seated position, which in turn causes separator pin 68 to move supply ball 48 off of its seat 46 to its open position. This position is shown in FIG. 3.

Referring now to the solenoid actuator portion 14 of valve 10, a cylindrical tube 74 of nonmagnetic material such as stainless steel or aluminum alloy forms the body or base of solenoid actuator 14. Solenoid coil 76 is coaxially mounted on tube 74 and has an external housing 78 of nonmagnetic material. Electrical supply conductors 80 extend through a suitable opening in housing 78 into electrical connection with coil 76.

The stator or fixed piece 82 of solenoid 14 is an elongated, cylindrical body of magnetic material and is mounted in the forward portion of tube 74 in registry with the forward portion of coil 76, extending forwardly of both tube 74 and coil 76. Stator 82 has an axial passage 84 extending therethrough. A pair of sharp-edged external annular grooves 86 in the rearward portion of stator 82 enables the stator 82 to be positively axially located in tube 74 by annular swaging of tube 74 into grooves 86. Stator 82 extends forwardly into and is axially secured within a rearwardly opening counterbore 88 in valve body 16. A spring-fingered washer 90 is lockingly engaged over the outer surface of tube 74 and is moved forwardly with the coil housing 78 to secure the coil housing 78 flush against the rearward face of valve body hex nut 22.

The solenoid plunger is generally designated 92, and includes a rearward armature 94 of magnetic material and a forwardly extending valve actuator pin 96 which is press-fitted into an axial hole in the forward end of armature 94. There is substantial annular space between the outer surface of armature 94 and the inner surface of tube 74 to minimize fluid damping of axial movement of armature 94. An end plug 98 of nonmagnetic material is locked and sealed in position in the rear end of tube 74 by annular swaging of the wall of tube 74 into a pair of sharp-edged external annular grooves 100 on end plug 98. The inner, forward surface of end plug 98 determines the rearwardmost limit of travel of solenoid plunger 92.

The valve actuator pin 96 is a long pin or rod having its rear end portion 102 fixedly secured in the forward portion of armature 94 and extending forwardly from armature 94 through the axial passage 84 in stator 82 and thence through a guide ring 104 mounted in valve body bore 32 to a front end 106 which engages the rearwardly facing surface of vent ball 60. When the solenoid coil 76 is energized, the valve actuator pin 96 tends to become accurately aligned with the axis of valve body 16 because of the guide ring 104 and because the strong magnetic field from coil 76 centers the armature 94 in tube 74.

Conventional practice in solenoid-actuated ball poppet valves, including those utilized for fuel injector actuation, has been to square off the ends of valve actuator pins, including the forward, operative end of the solenoid plunger pin and both ends of the separator pin where such is employed. This results in point contact between the balls and flat pin ends, and consequent high contact stresses being applied to the pin ends. This problem is most severe with the solenoid plunger pin both because it is the primary member which moves the entire weight of both balls and the separator pin, and because of tolerances discussed below, it has room to accelerate to high velocity before impacting its respective ball, which results in high impact forces.

When the fuel injector actuator usage of the solenoid valve 10 is considered, such high point contact stresses become critical and render the conventional flat pin ends inadequate for the purpose. The solenoid actuating force level, which is the magnetic attraction force between the stator 82 and armature 94 of the solenoid, is a square function which is at its maximum when the magnetic gap, designated 105, is at its minimum at the end of the solenoid stroke when actuator pin 96 seats the vent ball 60 against its seat 58. For the fuel injector actuator usage of valve 10, the vent port 56 and seat 58 preferably have a larger area than the supply port 44 and seat 46 for rapid return of the injector piston when the solenoid is de-energized. This enlarged vent port and seat area requires a maximum solenoid force, and hence minimum magnetic gap 105, for the seated position of vent ball 60, at which time the full supply pressure is applied to it through supply port 44, supply holes 52, annular recess 54, vent holes 64, and vent port 56.

To assure positive unseating force on supply ball 48 and seating force on vent ball 60 against the high fluid pressures applied to them, the magnetic gap 105 at the end of the stroke of solenoid plunger 92 must be held to within approximately 0.002 to 0.003 inch. If the magnetic gap 105 were to completely close as a result of the repeated peening action between the vent ball 60 and the operative front end 106 of valve actuator pin 96, then the valve would become inoperative. Such event would be highly likely for the fuel injector usage of the solenoid valve for the following reasons. First, the required axial ball travel between the closed or unactuated position of the valve shown in FIG. 2 and the open or actuated position of the valve shown in FIG. 3 is approximately 0.014 to 0.015 inch. An additional approximately 0.005 to 0.006 inch manufacturing tolerance is required between the rear end of solenoid plunger armature 94 and the rear end plug 98. Assuming the solenoid plunger 92 starts a stroke with armature 94 resting against rear end plug 98 the plunger 92 has this approximately 0.005 to 0.006 manufacturing tolerance travel for acceleration before actuator pin 96 impacts the full combination of ball 60 separator pin 68, and ball 48, such impacting being against the force that the high supply fluid pressure applies to supply ball 48 over the area of its valve seat 46. Then, a further impacting of the end 106 of actuator pin 96 against ball 60 occurs at the end of the approximately 0.014 to 0.015 inch valve opening travel when the vent ball 60 bottoms in its valve seat 58. These two impacts of end 106 of actuator pin 96 against ball 60 occur during each cycling of the valve, which is up to 120 times a second for current fuel injector requirements, and up to 200 times per second for the current capability of the solenoid valve 10; and for the fuel injector usage, the valve 10 must be capable of on the order of 500 million to a billion such cycles The balls 48 and 60 are provided in a Rockwell C hardness of approximately 62 to 64, while the actuator pin 96 and separator pin 68 are slightly softer, having a Rockwell C hardness in the range of approximately 55 to 58. The result is that with the conventional squared-off actuator pin end, with such high speed, high cycle operation against the forces of high fluid pressure in the range of approximately 600 to 1,500 psig, and up to the current fluid pressure capability of approximately 3,000 psig of the valve 10, the peening action of the ball 60 against the operative end 106 of actuator pin 96 will be likely to dent and distort the pin end 106 axially to the extent of 0.002 to 0.003 inch and thereby render the valve inoperative for the fuel injector actuator purpose. Similar denting and distortion of the ends of separator pin 68 would further impair the operation of the valve. Long before the valve became inoperative, such pin end denting and distortion would interfere with the desired repeatability of valve function.

Another problem with the use of conventional squared-off pin ends in a high speed, high cycle valve of the type to which the present invention relates is that such pin ends provide no ball centering action. As best seen in FIG. 3, for full freedom of ball movement, substantial clearance is provided between each of the balls 48 and 60 and its respective cage formed by guide fingers 50 and 62. This results in the balls 48 and 60 tending to approach their respective valve seats 46 and 58 off center, with resulting eccentric wear on the seats for the high speed, high cycle fuel injector usage This problem is most severe with respect to the vent ball 60 which is being positively driven into its valve seat 58 with maximum solenoid force when the magnetic gap 105 is at its minimum.

The lack of centering action of squared-off valve pins, and particularly the actuator pin 96 as it drives the vent ball 60 at its valve seat 58, tends to cause inaccuracy in short-term repeatability of valve function, while the resulting valve seat wear and the pin end wear cause cumulative inaccuracy in long-term repeatability of valve function. These are serious deficiencies in a fuel injector valve where accuracy of both short-term and long-term repeatability is important.

According to the present invention, these problems of pin end wear and ball misalignment and consequent valve seat wear are overcome by providing a concave end on the valve actuator pin 96, and preferably also providing similar concave ends on both extremities of the separator pin 68. Three forms of pin end concavities are illustrated in the drawings and described hereinafter with respect to the forward, operative end of valve actuator pin 96, and it is to be understood that similar forms of concavities may be employed for one or both ends of separator pin 68.

A first form of pin end concavity is illustrated for front end 106 of valve actuator pin 96 in FIGS. 4–7, consisting of a conical recess generally designated 108. Recess 108 is defined by a conical surface 110 which is annular about the central longitudinal axis of pin 96 and extends from a bottom, center point 112 to an outer, forward annular edge 114 which is preferably radially inwardly offset from the peripheral edge 116 of pin 96 so as to maintain peripheral strength in the pin 96 proximate its front end 106. This leaves a flat annular forward face 18 of pin 96 between cone edge 114 and peripheral edge 116.

Figure 4:
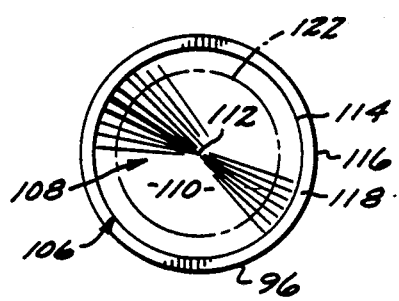
FIG. 4 is a front end elevational view, taken on the line 4—4 in FIG. 5, of the solenoid plunger pin of the valve in a form of the invention having a conical recess, with a circular phantom line illustrating the line of contact between the conical forward surface of the pin and the respective ball poppet in the energized, actuated condition of the solenoid valve.
Figure 5:
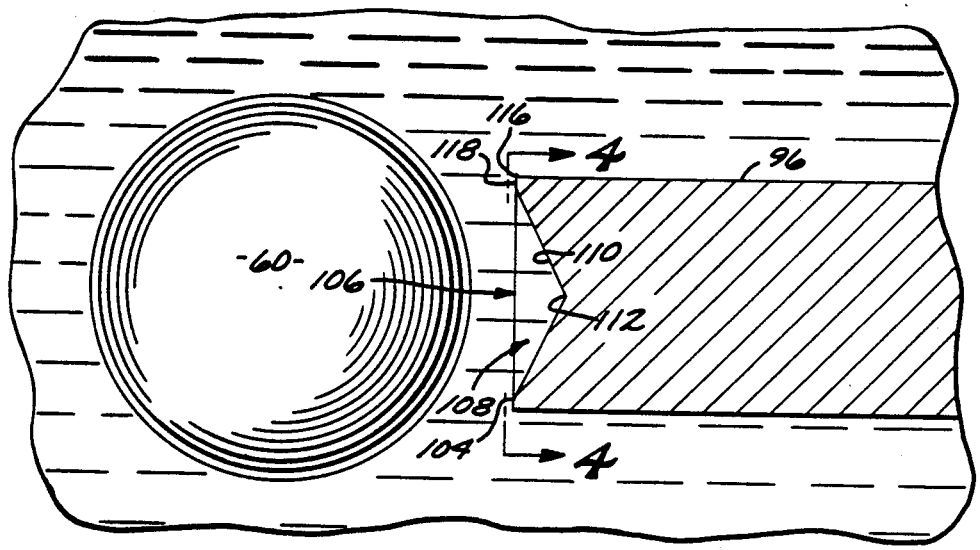
FIG. 5 is a greatly enlarged fragmentary axial section, partly in elevation, showing the conically recessed solenoid plunger pin and its respective ball poppet spaced apart in the unenergized or unactuated condition of the solenoid valve.
Figure 6:
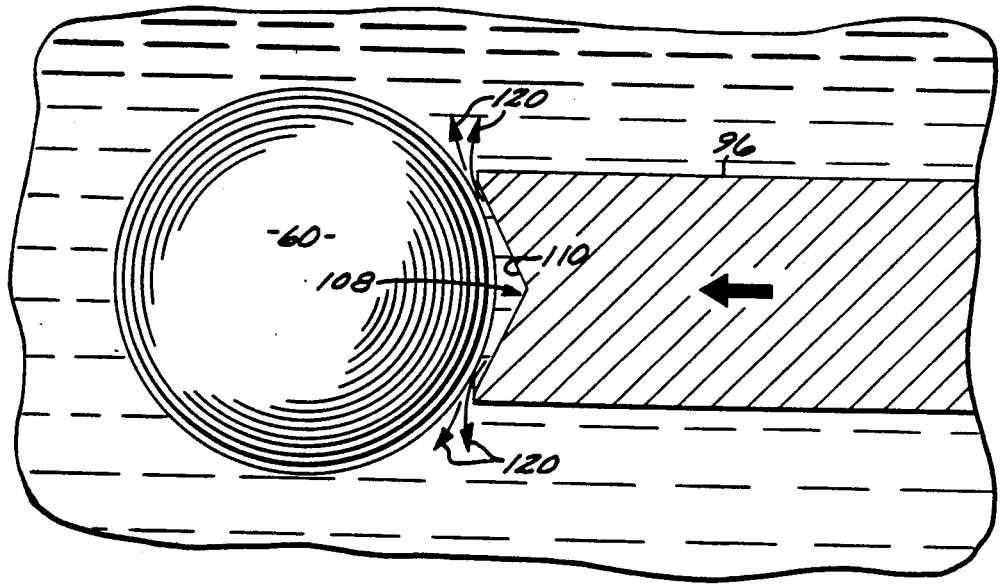
FIG. 6 is a view similar to FIG. 5, but with the solenoid valve energized and the solenoid plunger pin partially actuated forwardly to a position close to its respective ball poppet, with arrows illustrating a squish-damping effect of fluid captured between the conical recess in the pin end and the ball which damps impacting engagement between the pin and ball.
Figure 7:
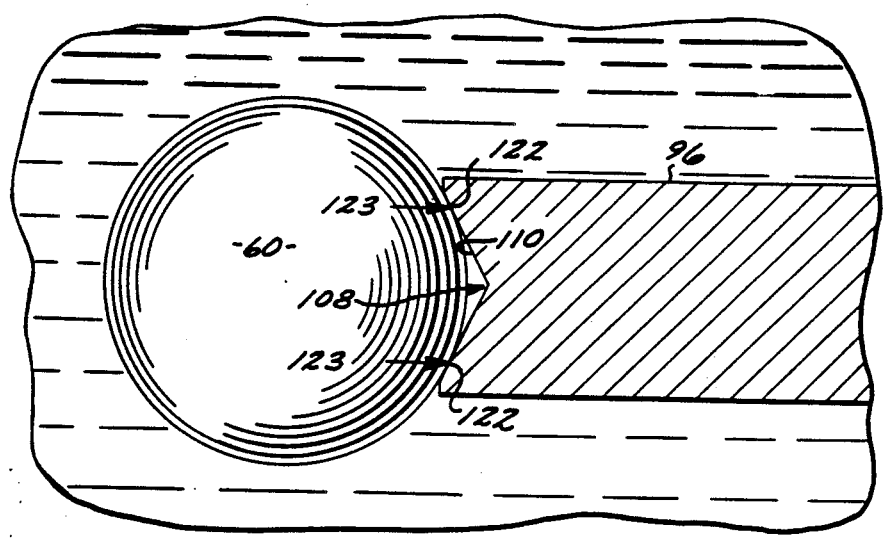
FIG. 7 is a view similar to FIGS. 5 and 6, but with the valve further energized and actuated such that the solenoid plunger pin is fully engaged with the respective ball poppet, with arrows illustrating the circular line contact between the conical surface of the pin and the ball.

FIGS. 5, 6 and 7 illustrate a sequence of the vent ball 60 seating in the conical recess 108, and FIG. 6 particularly illustrates a novel squish-damping effect achieved by the conical recess 108 that materially softens the impacting of actuator pin 96 against vent ball 60, which is an important factor in reducing wear on the front end 106 of pin 96. As seen in FIGS. 5, 6 and 7, the actuator pin 96 and vent ball 60 are both fully immersed in fluid, which for the fuel injector application of valve 10 will be diesel fuel, gasoline, or other fuels. The sequence of FIGS. 5, 6 and 7 occurs for each stroke of the solenoid plunger 92. In FIG. 5, the conical surface 110 of pin 96 is seen spaced from vent ball 60. In FIG. 6, the conical surface 110 is seen approaching the spherical surface of ball 60, and the arrows 120 indicate the radially outwardly directed flow of fluid being displaced from within the conical recess 108 as its surface 110 approaches the surface of ball 60. The closer these surfaces approach each other, the smaller the annular clearance therebetween, and the higher the fluid pressure buildup within conical recess 108. This pressure effectively damps the impact of conical surface 110 against the surface of ball 60 when the surfaces come together as seen in FIG. 7. Contact is made at an annular contact line 122 designated by the arrows 123 in FIG. 7 and illustrated in phantom in FIG. 4.

It will be seen from FIGS. 5, 6 and 7 that despite any initial misalignment of ball 60 relative to the axis of valve body 16, when actuator pin 96 comes into full engagement with ball 60 the conical recess 108 will guide ball 60 into axial alignment with actuator pin 96. Since actuator pin 96 tends to be accurately axially aligned with valve body 16 as described hereinabove, the pin 96 will accordingly hold the ball 60 in axial alignment with its valve seat 58 as the ball is driven into the seat 58. This results in both short-term and long-term repeatability of ball seating in the valve seat 58, with resulting accurate repeatability of valve function and minimization of valve seat wear.

The force applied by ball 60 against the front end 106 of actuator pin 96 is applied substantially uniformly around the entire annular line of contact 122 instead of being the usual point contact, which minimizes metal distortion in the front end 106 of pin 96, and results in minimial deviation of the magnetic gap 105 over a long operational life of the valve 10, such as from approximately 500 million to a billion cycles for the fuel injector application.

The included angle of the conical surface 110 is preferably at least approximately 120°, and for such shallow included angle the annular contact line 122 is offset substantially radially inwardly from the peripheral edge 116 of pin 96 and the radially outwardly directed force vector of ball 60 against conical surface 110 is minimized such that there will be no material radially outwardly directed distortion of metal in the front end 106 of pin 96 for the high cycle operational life of valve 10 in the fuel injector use.

Figure 8:
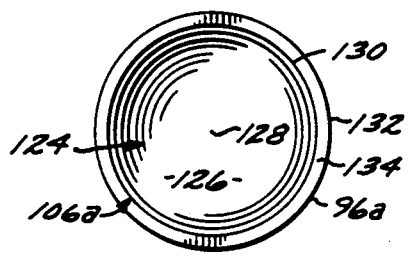
FIG. 8 is a front end elevational view similar to FIG. 4, taken on the line 8—8 in FIG. 9, illustrating a second form of the invention wherein the pin end concavity is spherical in form, with a radius of curvature substantially the same as that of the respective ball poppet.
Figure 9:
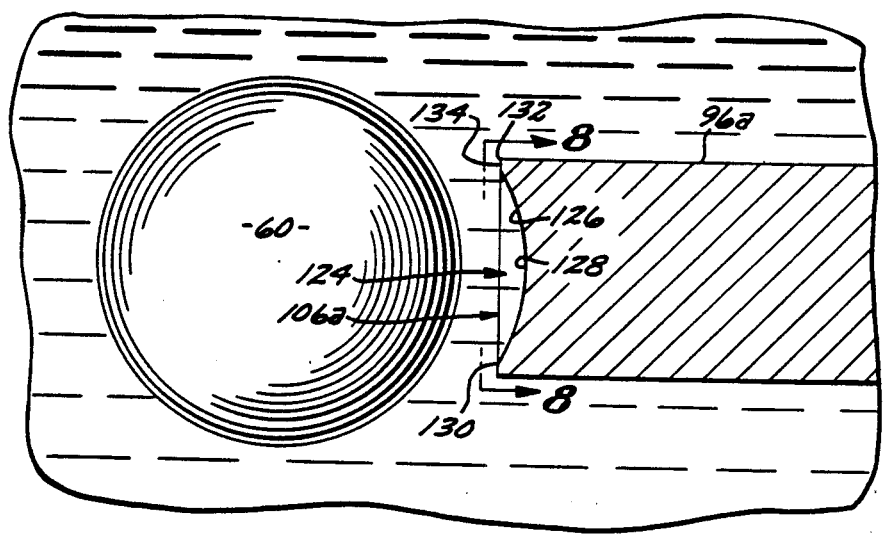
FIG. 9 is a fragmentary axial sectional view, partly in elevation, similar to FIG. 5, but illustrating the spherical surface form of the invention shown in FIG. 8.

FIGS. 8 and 9 illustate an alternative form of valve actuator pin generally designated 98a which has a second form of concaved front end 106a in which the concavity is a spherical recess generally designated 124. Spherical recess 124 is defined by a spherical surface 126 which is annular about the central longitudinal axis of pin 96a and extends from a central bottom 128 forwardly and outwardly to a forward, outer edge 130 which is preferably radially inwardly displaced from the outer edge 132 of pin 96a so that a flat annular forward face 134 of pin 96a is defined between the edges 130 and 132. The spherical recess 124 in the front end 106a of pin 96a serves the same squish-damping and ball centering functions described in detail hereinabove for the conical recess 108 shown in FIGS. 5, 6 and 7. Spherical recess 124 has an advantage over conical recess 108 in that the load between the pin and ball is distributed over the entire spherical surface 126 instead of around the annular contact line 122 of the conical surface 110. However, the spherical surface 126 has the disadvantage of initial engagement of the ball being at the abrupt outer forward edge 130 if the ball is initially out of axial alignment relative to the pin. This disadvantage is overcome in a third form of concaved forward pin end illustrated in FIG. 10.

Figure 10:
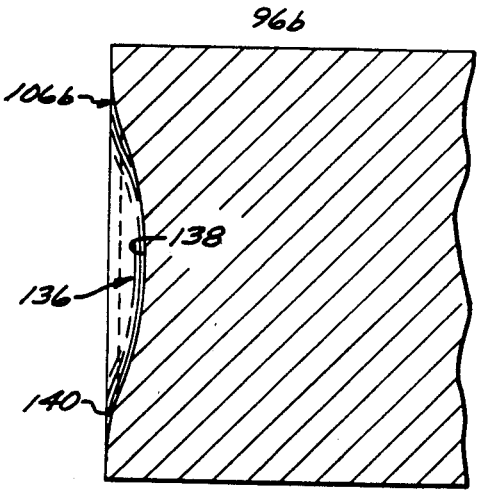
FIG. 10 is a greatly enlarged fragmentary axial section illustrating a third form of the invention in which the solenoid plunger pin concavity has a compound curvature, consisting of a spherical bottom portion and a forwardly and outwardly flared lead-in portion.

Referring to FIG. 10, a second alternative valve actuator pin generally designated 96b has its front end 106b provided with a compound recess 136 annularly located about the central axis of pin 96b and having a spherical bottom portion 138 which smoothly contours into a forwardly and radially outwardly flared or belled forward annular peripheral portion 140. In the event that the ball 60 is initially out of true axial alignment with the actuator pin 96, the initial contact between the surface of compound recess 136 and the ball 60 will be in the outwardly flared or belled forward portion 140 which will then cam the ball into the spherical bottom portion 138 and hence into accurate axial alignment with the pin 96b and hence with the valve seat.

A similar centering cam action will occur if the ball is initially off center when it is engaged by the conical surface 110 in the front end 106 of pin 96. However, the compound recess 136 in the front end 106b of pin 96b still has the advantage over the conical recess of extended surface contact between the ball and the spherical bottom portion 138, the bottom portion 138 having substantially the same radius of curvature as the spherical surface of ball 60. The compound recess 136 has the same squish-damping benefit as the conical recess 108 and the spherical recess 124.

While the present invention has been shown and described in detail in connection with a normally closed three-way poppet valve embodying two ball poppets separated by a separator pin, it is to be understood that the invention is also applicable to a normally open three-way ball poppet valve having a pair of ball poppets separated by a separator pin in which both of the ball seats are at the opposite sides of the balls from the separator pin instead of at the same sides of the balls as the separator pin as in the form shown and described herein. Such normally open three-way ball poppet valve is illustrated in FIG. 4 of the aforesaid copending application Ser. No. 411,298, now U.S. Pat. No. 4,610,267. It is also to be understood that the present invention may be employed in a two-way ball poppet valve which is either normally open or normally closed. Such a normally closed two-way ball poppet valve is illustrated in FIG. 13 of the aforesaid application Ser. No. 411,298, now U.S. Pat. No. 4,610,267.

Although the present invention is not limited to any particular size valves, for the fuel injector actuator usage of the invention, typically the ball diameter will be 0.09375 inch (3/32 inch) with a valve seat orifice size up to 0.075 inch, or a ball diameter of 0.125 inch (⅛ inch) with a valve seat orifice diameter up to 0.105 inch. Also for this usage, typically the valve actuator pin 96 may be 0.0625 inch (1/16 inch), and in some cases the operative front end 106 may be necked down to 0.03125 inch (1/32 inch). Typically, the separator pin will be provided in 0.03125 inch (1/32 inch) diameter for a 0.09375 inch (3/32 inch) ball size, and 0.047 inch diameter for the 0.125 inch (⅛ inch) ball size. Such dimensions are given by way of example only, and not of limitation.

While the present invention has been described with regard to particular embodiments, modifications may readily be made by those skilled in the art, and it is intended that the claims cover any such modifications which fall within the scope and spirit of the invention as set forth in the appended claims.

I claim:

1. A high speed, high pressure, high cycle solenoid-actuated fluid valve of the ball poppet type suitable for use as a fuel injector actuator and timer, which comprises:
   a valve portion having a valve body defining fluid passage means therethrough, an annular valve seat in said fluid passage means, and a ball poppet valve element movable between a closed position in which it is engaged on said seat and an open position in which it is spaced off of said seat, and
   a solenoid portion connected to said valve portion, said solenoid portion having an electromagnetically actuated plunger with a metal valve actuator pin thereon, said pin having a radially symmetrical free front end which, when said plunger is actuated, engages said ball poppet valve element and moves said ball poppet valve element from one of its said positions to its other said position,
   said pin end having a radially symmetrical concavity therein which is coaxial with said pin front end and faces toward said ball poppet valve element and within which said ball poppet valve element is engaged along at least a line contact so as to extend the region of contact between said pin end and said ball poppet valve element and thereby reduce impact wear on said pin end,
   said engagement of said ball poppet valve element within said concavity being radially symmetrical and coaxial with said concavity and being substantially spaced radially inwardly from the periphery of said pin front end so that there will be no material radially outwardly directed distortion of metal in said pin front end to enable a high cycle operational life of said valve,
   fluid captured between said ball poppet valve element and said concavity providing squish-damping as said pin end approaches said ball poppet valve element so as to further reduce impact wear on said pin end.

2. A solenoid-actuated valve as defined in claim 1, wherein said concavity is substantially conical.

3. A solenoid-actuated valve as defined in claim 2, wherein said region of contact is substantially a circular line contact within said concavity.

4. A solenoid-actuated valve as defined in claim 2, wherein the included cone angle of said conical concavity is at least approximately 120°.

5. A solenoid-actuated valve as defined in claim 1, wherein said concavity is substantially spherical with substantially the same radius of curvature as said ball poppet valve element.

6. A solenoid-actuated valve as defined in claim 1, wherein said concavity has a compound surface configuration with a substantially spherical bottom portion and an outwardly flared forward, peripheral lead-in portion, said substantially spherical bottom portion having substantially the same radius of curvature as said ball poppet valve element.

7. A solenoid-actuated valve as defined in claim 1, wherein said valve actuator pin has a longitudinal axis that is substantially coaxially aligned with said annular valve seat, and said concavity is radially symmetrical about said actuator pin axis, whereby when said ball poppet valve element is engaged in said concavity, the concavity will tend to hold the ball poppet valve element in axial alignment with said valve seat and thereby minimize eccentric wear of said valve seat.

8. A solenoid-actuated valve as defined in claim 7, wherein said ball poppet valve element is normally in said open position and upon actuation of said solenoid plunger, said front end of said actuator pin drives said ball poppet valve element onto said valve seat, said concavity tending to hold said ball poppet valve element in axial alignment with said seat as the ball poppet valve element is being thus driven onto the seat.

9. A solenoid-actuated valve as defined in claim 7, wherein said valve body defines second fluid passage means therethrough, a second annular valve seat in said second fluid passage means, and a second ball poppet valve element movable between a closed position in which it is engaged on said second seat and an open position in which it is spaced off of said second seat,
   said second valve seat being substantially coaxially aligned with said first-mentioned valve seat and said actuator pin axis, and
   a metal separator pin slideably mounted in said valve body and having a longitudinal axis substantially coaxially aligned with said valve seats, opposite ends of said separator pin being engageable against the respective said ball poppet valve elements, said separator pin having a length such that when one of said ball poppet valve elements is seated, it will, through the length of said separator pin, hold the other said ball poppet valve element off of its seat, movement of said first-mentioned ball poppet valve element by said actuator pin carrying with it the mass of said separator pin and said second ball poppet valve element.

10. A solenoid-actuated valve as defined in claim 9, wherein at least one end of said separator pin is radially symmetrical and has a radiallly symmetrical concavity therein which is coaxial with said pin front end and faces toward its respective said ball poppet valve element and within which such ball poppet valve element is engaged along at least a line contact so as to extend the region of contact between such separator pin and such ball poppet valve element and thereby reduce impact wear on such separator pin end,
   said engagement of said ball poppet valve element within said separator pin concavity being radially symmetrical and coaxial with said separator pin concavity and being substantially spaced radially inwardly from the periphery of said one end of said separator pin so that there will be no material radially outwardly directed distortion of metal in said one end of said separator pin to enable a high cycle operational life of said valve.

11. A solenoid-actuated valve as defined in claim 10, wherein each end of said separator pin has such a concavity therein.

12. A solenoid-actuated valve as defined in claim 10, wherein said concavity is substantially conical and said region of contact is substantially a circular line contact within said concavity.

13. A solenoid-actuated valve as defined in claim 10, wherein said concavity is substantially spherical with substantially the same radius of curvature as said first-mentioned ball poppet valve element.

14. A solenoid-actuated valve as defined in claim 10, wherein said concavity has a compound surface configuration with a substantially spherical bottom portion and an outwardly flared forward, peripheral lead-in portion, said bottom portion having substantially the same radius of curvature as said first-mentioned ball poppet valve element.

* * * * *